(12) United States Patent
Xirouchakis et al.

(10) Patent No.: US 10,531,416 B2
(45) Date of Patent: Jan. 7, 2020

(54) RANGE EXTENSION OF LTE CELLS

(71) Applicant: Sequans Communications S.A., Colombes (FR)

(72) Inventors: Ioannis Xirouchakis, Colombes (FR); Serdar Sezginer, Colombes (FR)

(73) Assignee: SEQUANS COMMUNICATIONS S.A., Colombes (FR)

( * ) Notice: Subject to any disclaimer, the term of this patent is extended or adjusted under 35 U.S.C. 154(b) by 67 days.

(21) Appl. No.: 15/823,274

(22) Filed: Nov. 27, 2017

(65) Prior Publication Data

US 2018/0152904 A1    May 31, 2018

(30) Foreign Application Priority Data

Nov. 28, 2016   (EP) .................................... 16306567

(51) Int. Cl.
*H04W 56/00* (2009.01)
*H04W 72/04* (2009.01)
*H04W 74/08* (2009.01)

(52) U.S. Cl.
CPC ....... *H04W 56/005* (2013.01); *H04W 56/003* (2013.01); *H04W 56/006* (2013.01); *H04W 72/0446* (2013.01); *H04W 74/085* (2013.01); *H04W 72/0406* (2013.01)

(58) Field of Classification Search
CPC ............... H04W 52/58; H04W 56/001; H04W 56/0015; H04W 56/002; H04W 56/003; H04W 56/004; H04W 56/0045; H04W 56/0055; H04W 56/006; H04W 56/0065; H04W 72/04; H04W 72/0413; H04W 72/0473; H04W 72/1284; H04W 74/004; H04W 74/0833; H04W 74/0891; H04W 74/008
See application file for complete search history.

(56) References Cited

U.S. PATENT DOCUMENTS

| | | | |
|---|---|---|---|
| 2011/0310857 A1 | 12/2011 | Vujcic | |
| 2013/0039195 A1* | 2/2013 | Weng | H04W 48/20 370/252 |
| 2014/0044108 A1 | 2/2014 | Earnshaw et al. | |
| 2014/0120893 A1* | 5/2014 | Malladi | H04W 52/0206 455/418 |
| 2014/0177525 A1* | 6/2014 | Aydin | H04W 4/70 370/328 |

(Continued)

FOREIGN PATENT DOCUMENTS

| | | |
|---|---|---|
| EP | 3030018 | 6/2016 |
| WO | WO 2008097142 | 8/2008 |

*Primary Examiner* — Hoang-Chuong Q Vu
(74) *Attorney, Agent, or Firm* — Hamilton, Brook, Smith & Reynolds, P.C.

(57) ABSTRACT

A method of synchronizing uplink between a UE and a cell, the method comprising determining PRACH capabilities of the UE, determining a negative timing offset for use with the transmission of at least one PRACH signal, determining an order for utilizing the negative timing offset, transmitting from the UE, at least one PRACH signal from a group of N PRACH signals, each of the at least one PRACH signals having a predetermined power level and transmitted by the UE at a time based on the negative timing offset, the order, and the PRACH capabilities of the UE.

17 Claims, 5 Drawing Sheets

(56) References Cited

U.S. PATENT DOCUMENTS

| | | | |
|---|---|---|---|
| 2014/0198708 A1* | 7/2014 | Lee | H04W 76/14 |
| | | | 370/312 |
| 2014/0254564 A1* | 9/2014 | Khude | H04W 16/10 |
| | | | 370/336 |
| 2015/0049663 A1* | 2/2015 | Mukherjee | H04W 16/26 |
| | | | 370/315 |
| 2015/0049753 A1* | 2/2015 | Park | H04W 56/0045 |
| | | | 370/350 |
| 2015/0181546 A1* | 6/2015 | Freda | H04W 56/0015 |
| | | | 370/336 |
| 2016/0007377 A1 | 1/2016 | Frenne et al. | |
| 2017/0019932 A1* | 1/2017 | Su | H04W 74/0833 |
| 2017/0279646 A1* | 9/2017 | Yi | H04L 5/0053 |
| 2019/0028980 A1* | 1/2019 | Feuersaenger | H04W 52/281 |

* cited by examiner

RANGE EXTENSION OF LTE CELLS

RELATED APPLICATION

This application claims priority under 35 U.S.C. § 119 or 365 to Europe, Application No. 16306567.5, filed Nov. 28, 2016. The entire teachings of the above application is incorporated herein by reference.

TECHNICAL FIELD

This disclosure relates to extending the range of LTE cells by way of a method carried out at a UE.

BACKGROUND

Each cell of a 3GPP Long Term Evolution network has a maximum cell radius (maximum distance to a connected user equipment (UE)) of up to approximately 100 km. One of the parameters that determines the maximum cell radius is the maximum supported round trip delay (RTD) of a transmitted signal to/from a UE that the random access (RA) procedure can support, as would be understood. The cell (eNodeB) configures the maximum supported RTD and cell radius through the preamble format (0, 1, 2, 3 or 4*, according to 3GPP TS 36.211).

In known systems, if a User Equipment (UE) is located outside the maximum cell radius defined by the preamble format configuration, the UE and eNodeB will not be able to establish a connection. This is due to the fact that the uplink (UL) physical random access channel (PRACH) signal transmitted by the UE will be received outside the PRACH detection window of the eNodeB because the RTD will exceed the maximum foreseen value. Thus, the eNodeB will not be able to detect the UE's request to connect to the cellular network and a connection will not be established between the UE and the eNodeB.

There may be certain scenarios where it would be advantageous for a UE to be able to establish connection to a cell when it is located outside the maximum cell radius. For example, to allow coverage in areas with coverage holes or in the absence of neighbor cells, to allow emergency calls when the UE is out of range or to allow reuse of LTE technology for networks which are designed for larger than 100 km cell radius, for example networks involved with air to ground communication etc.

Further, being able to operate outside the maximum cell radius would allow devices using LTE Machine Type Communication (MTC) and/or Narrowband-Internet of Things (NB-IoT) to extend their range coverage. MTC (also known as Cat-M) and NB-IoT are the two 3GPP UE categories introduced to the LTE standards in order to support Internet of Things-type services.

Such devices may apply a coverage enhancement (CE) feature which can increase the device's maximum coupling loss (MCL) by more than 15 dB. The coupling loss is defined as the total long-term channel loss over the link between the UE antenna ports and the cell antenna ports. In practice this also includes losses due to antenna gains, path loss, shadowing, body loss, etc. The maximum coupling loss (MCL) is the limit value of the coupling loss at which the underlying service can be delivered, and therefore defines the coverage of the service [3GPP TS36.824 s5.1.2].

This CE may extend the cell range to more than 400 km, i.e. approximately 300% larger than the legacy maximum cell range. However, the existing RA procedure design would not allow these devices to establish connection owing to their position exceeding the maximum RTD as previously discussed.

According to 3GPP LTE standards, a UE is obliged to limit its connection range to be within the maximum cell radius, which is defined by the maximum round trip delay of the configured preamble format because, inherently, the RA procedure cannot cope with RTDs over the preamble configured maximum.

Accordingly there is a need to extend the range of cells and UEs of a 3GPP LTE network.

SUMMARY

According to a first aspect there is provided a method of synchronizing uplink between a UE and a cell as defined in claim 1 of the appended claims. Thus there is provided a method comprising determining PRACH capabilities of the UE, determining a negative timing offset for use with the transmission of at least one PRACH signal, determining an order for utilizing the negative timing offset, transmitting from the UE, at least one PRACH signal from a group of N PRACH signals, each of the at least one PRACH signals having a predetermined power level and transmitted by the UE at a time based on the negative timing offset, the order, and the PRACH capabilities of the UE.

Optionally, wherein transmission of each PRACH signal is repeated at a different power level.

Optionally, wherein each PRACH signal is transmitted before the RA response window of the previously transmitted PRACH has expired.

Optionally, wherein the order is based on an estimated distance between the UE and the cell.

Optionally, wherein the estimated distance is derived by at least one of GPS, A-GNSS, ECID, OTDOA, or UTDOA.

Optionally, wherein the estimated distance is derived from a UE pathloss estimate between the UE and the cell and the preamble format of the cell.

Optionally, wherein the negative timing offset is derived from a guard time of the preamble format of the cell.

Optionally, wherein N is based on the extended cell radius of the cell and the negative timing offset.

Optionally, wherein if the UE is able to transmit a plurality of PRACH signals per uplink subframe and receive a plurality of RA responses per downlink subframe, the UE derives a different PRACH signature for the transmission of each PRACH signal and transmits the PRACH signals in the same uplink subframe.

Optionally, wherein the UE transmits the same PRACH signals in a subsequent uplink subframe and at a different power level.

Optionally, wherein the UE transmits a PRACH signal to avoid overlapping with any previously transmitted PRACH signal based on the RA response window width of the UE and the frequency of PRACH subframes transmitted.

Optionally, wherein if the RA response window of the UE is not longer than the inverse of the frequency of PRACH subframes, the UE transmits a PRACH signal on every PRACH subframe.

Optionally, wherein if the RA response window of the UE is longer than the inverse of the frequency of PRACH subframes, the UE does not transmit a PRACH signal where the corresponding RA response window would overlap with the RA response window of a previously transmitted PRACH signal.

Optionally, wherein if transmission of a PRACH signal positions the PRACH signal within the PRACH detection window of a cell and detectable by a cell; receiving a response in an RA response window of the UE from the cell, the response comprising a timing advance value, and synchronising an uplink between the UE and the cell by the UE modifying uplink timing by the negative offset and the timing advance value.

Optionally, wherein when all of the PRACH signals from the group of N PRACH signals have been transmitted at the first power level, if an RA response has not been received from the cell, the UE repeats transmission of the same PRACH signals at a different increased power level.

Optionally, wherein the cell is an eNodeB.

According to a second aspect there is provided an apparatus as defined in claim 14. The apparatus comprising a processor, the processor arranged to execute computer instructions which when executed cause the processor to perform the method of any previous claim.

Optionally, the apparatus comprises a UE, and optionally the UE comprises a mobile communications device.

According to a third aspect there is provided a computer readable medium as defined in claim 15. The computer readable medium comprising instructions that when executed cause a processor to execute any of the methods and/or method steps as disclosed herein.

Preferable and optional features are defined in the dependent claims.

With all the aspects, preferable and optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

DETAILED DESCRIPTION

Figure 1:
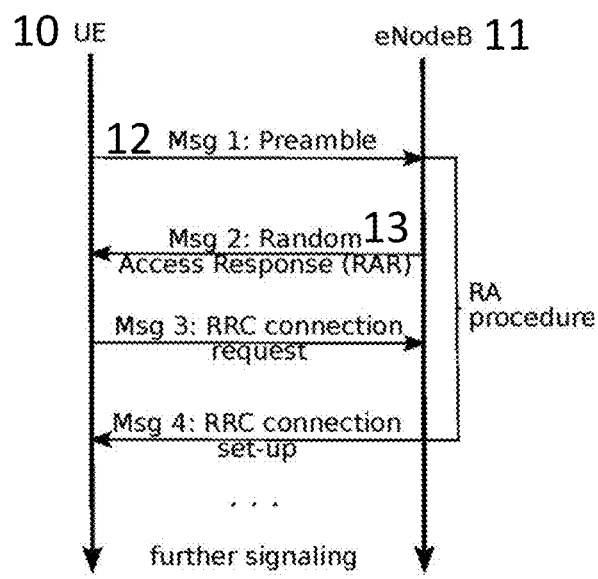
FIG. 1 illustrates a typical RA connection procedure.
Figure 2:
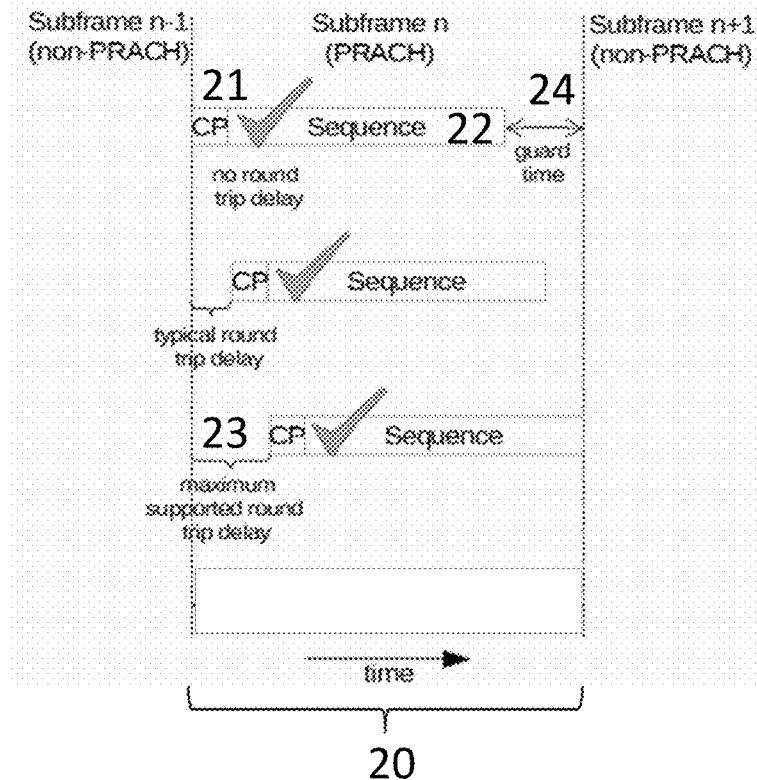
FIG. 2 illustrates a PRACH capture window and associated signals.

Turning to FIG. 1 which illustrates a typical RA connection procedure between a UE 10 and a cell (eNodeB) 11, and FIG. 2 which illustrates a PRACH capture window 20 at a cell 11 and associated signals, in known systems, when a UE 10 detects a cell 11, a PRACH preamble 12 (comprising cyclic prefix, CP 21 and data sequence 22) is sent by the UE during a predefined UL PRACH subframe with a specific power $P_{PRACH}$. If the UE 10 is within the maximum cell radius (ie the RTD between UE and cell is not greater than the maximum supported RTD 23), the signal from the UE should be detected during the cell's PRACH detection window (see 20 of FIG. 2). After detection, the cell sends an RA response 13 which is detected at the UE within a configured respective RA response window.

If the PRACH preamble 12 is not detected at the cell 11, and therefore UE 10 does not receive an RA response within the respective RA response window, after expiry of the RA response window, the UE assumes that the non-detection is due to pathloss attenuation between the UE and the cell. In order to try to connect to the cell, the UE will then send additional PRACH preamble 12 with higher power where $P_{PRACH,next} = P_{PRACH,previous} + \text{powerStep}$ [dB], where powerStep is a configured step increase of the PRACH signal power. The UE will stop sending PRACH attempts when an RA response 13 is received, a configured maximum number of attempts is reached, or a maximum power level of the PRACH preamble signals is reached.

Figure 3:
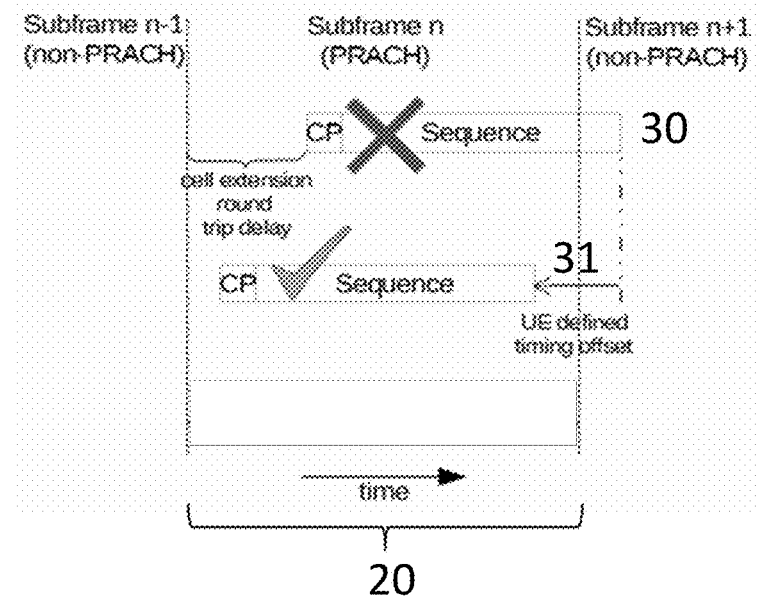
FIG. 3 illustrates a negative timing offset to allow PRACH signal detection according to an embodiment.

If the UE is located outside the maximum cell radius corresponding to the configured preamble format, the PRACH preamble attempts 12 will not be detected not only due to signal attenuation causing the signal to be below the nominal PRACH reception power at the cell, but also because the PRACH signals arrive at the cell outside the PRACH detection window 20 of the cell (see PRACH preamble 30 of FIG. 3). In the case of PRACH preamble 30, even if the UE attempts the previously mentioned power ramping of the PRACH signal, the PRACH signal will not cause a successful RA response from cell 11 at UE 10 because the PRACH preamble does not arrive at the cell within the PRACH detection window 20.

There will now be described a method to provide modifications to a UE's RA procedure (connection to a cell) by adapting the PRACH/RACH procedure in order to allow a UE that is further away from a cell than the maximum cell radius to connect to the cell and hence provide a cell radius extension, while remaining compliant with the related 3GPP LTE requirements.

Figure 4:
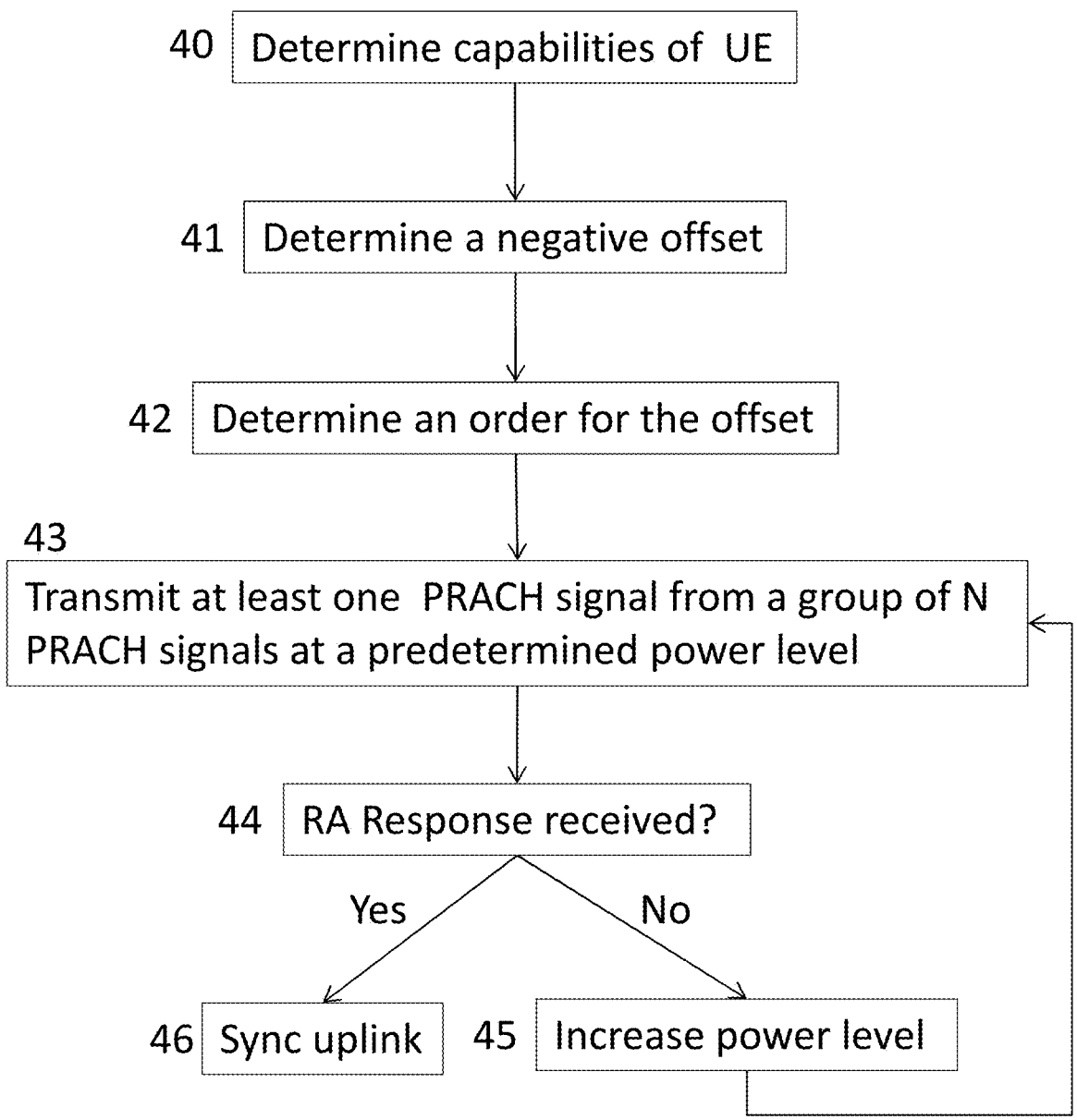
FIG. 4 illustrates a method according to embodiments.

Turning to FIG. 4, where the method is illustrated, in step 40, the capabilities of the UE are determined in relation to whether or not the UE is capable of transmitting a plurality of PRACH signals per uplink subframe and receiving a plurality of RA responses per downlink subframe.

This allows the minimization of additional time taken to complete the RA connection procedure over known methods as will be explained below.

In step 41, a negative timing offset is determined for use with subsequent transmission of PRACH preamble signals. The offset is a guard time, GT (as shown by 24 of FIG. 2) of the preamble format of the detected cell.

More specifically, the guard time length, T_GT in ms:

$$T\_GT = N\_sf - T\_CP - T\_SEQ, \text{ where}$$

N_sf is the length of the PRACH window in milliseconds,
T_CP is the length of the cyclic prefix of the PRACH signal, and
T_SEQ is the PRACH sequence length.

N_sf, T_CP and T_SEQ depend on the preamble format.

The guard time is loosely related to the propagation environment surrounding the cell as shown in table 1 below:

TABLE 1

| Preamble Format | Cell radius (km) | Guard Time (ms) | Propagation environment |
|---|---|---|---|
| 0 | ~14 | 0.097 | Urban micro |
| 1 | ~77 | 0.516 | Suburban macro |
| 2 | ~30 | 0.197 | Urban macro |
| 3 | ~107 | 0.716 | Suburban macro |

The negative timing offset, and optionally multiples thereof, is used in a subsequent method step to attempt to position a transmitted PRACH preamble signal within a PRACH capture window 20 of a detected cell 11.

As will be appreciated, there may be a plurality of PRACH preambles that are sent with different negative offsets at a particular PRACH preamble power level before connection is made to the cell.

In step 42, the order that the negative timing offset and multiples thereof are applied to each transmitted PRACH preamble is determined. This determination may be based on distance of the UE from the cell, and number of PRACH preambles to transmit at each power level.

The estimation of distance may be derived by GPS, A-GNSS, ECID, OTDOA, or UTDOA or any other suitable positioning technique. Alternatively, or additionally, the UE may derive its distance from the cell itself:

A UE is able to derive a pathloss estimate:

$$PL[dB] = P_{CRS}[dBm/15\ kHz] - RSRP[dBm/15\ kHz]$$

where: $P_{CRS}$ is the (known) transmit power of the Cell Reference Signals (CRS) and RSRP is the estimated received power of the CRS.

Having acquired the PL estimate, the distance d from the cell may be derived using a strictly monotonic pathloss vs. (log) distance mapping curve. The choice of curve can be based on the preamble format which indicates the propagation environment type (see Table 1). The curve may be provided by way of a look up table stored in UE memory that maps pathloss to distance for a given propagation environment. The lookup table data may be provided to the UE on the fly or preloaded.

With the distance estimate, d, the initial round trip delay, $RTD_0$ is calculated as:

$$RTD_0 = 2d/c$$

where c is the light speed.

The UE can then transmit different PRACH signals starting from $RTD_0$ and gradually stepping away from this starting point by a multiple of the negative offset, until all possible round trip delays are tested.

The total number of PRACH negative timing offsets per power ramping $N_{RTD}$, given as:

$$N_{RTD} = \text{ceil}(RTD_{max}/GT), \text{ where } RTD_{max} = 2R_{cell}/c,$$

where: $R_{cell}$ is the extended cell radius.

As can be seen, $N_{RTD}$ depends on the radius of the extended cell and the negative offset (GT of the preamble format of the detected cell).

Considering an example where $N_{RTD}=5$ and $RTD_0$ corresponds to the $4^{th}$ round trip delay ($N_{RTD}=4$), according to the PL vs distance function or other suitable distance determining method. In order to minimize the time take to find the offset that allows an RA response from a cell, the most probable offset of 4 is the first in the order. Thereafter, the remaining offsets are ordered according to their distance from the first offset in the order. In this example, the ordering of the RTD; round trip delays could be 4, 3, 5, 2, 1. Note that the 3 and 5 could be swapped, and the 2 and 1 could be swapped as they are the same distance from 4 as would be understood.

Ordering is undertaken as it is desirable to avoid delaying the PRACH procedure (establishing a link) as much as possible. Each PRACH attempt corresponds to a specific RTD and distance between a cell and the UE. The PRACH attempts are ordered based on that estimation, giving priority to the PRACH attempt which corresponds to the initially estimated cell/UE distance. As can be seen an educated guess is made as to how to order the N possible PRACH attempts. This ordering is not required when the UE is able to send all attempts simultaneously in the same subframe as determined in step 40.

Step 40 may be performed before or after steps 41 and 42.

In a transmitting step 43, the PRACH preamble signal(s) are transmitted at a predetermined power level based on steps 40 to 42.

As there may be up to $N_{RTD}$ PRACH preamble signal attempts per power level of PRACH preamble, preferably, the UE transmits the $N_{RTD}$ PRACH preamble signals in a manner so as to minimise the time required to receive an RA response from a cell. To this end, each subsequent PRACH transmission attempt may be made without waiting for the UE RA response window of the previous PRACH attempt to expire. This can be achieved in several ways depending on the UE capabilities as determined at step 40.

If the UE has the capability of transmitting several PRACH signals per uplink subframe and receiving (detecting) several RA responses per downlink subframe, the UE can derive $N_{RTD}$ different PRACH signatures and transmit them in the same PRACH subframe for a given power ramping. When the RA response window starts, the UE tries to detect all $N_{RTD}$ different RA response signatures during the window, and if transmitted with sufficient power, one of them should result in a RA response. This procedure does not introduce any additional RA response delay compared to the known conventional RA response procedure.

If the UE is not capable of transmitting parallel PRACH signals in the same uplink subframes or receiving multiple RA responses in the downlink subframes, then the regular RA detection procedure would cause additional attachment delay because the UE needs to wait for the expiration of an RA response window of a previously transmitted PRACH before it transmits another PRACH signal as would be understood.

To mitigate such a delay, a technique is disclosed where the RA response detection windows of adjacent PRACH attempts do not overlap. This reduces the attachment delay compared to the known procedure where the UE waits for expiration of the RA response window.

Since only one PRACH is monitored per RA response subframe, the different PRACH attempts can be transmitted using the same PRACH "signature" as would be understood.

Figure 5:
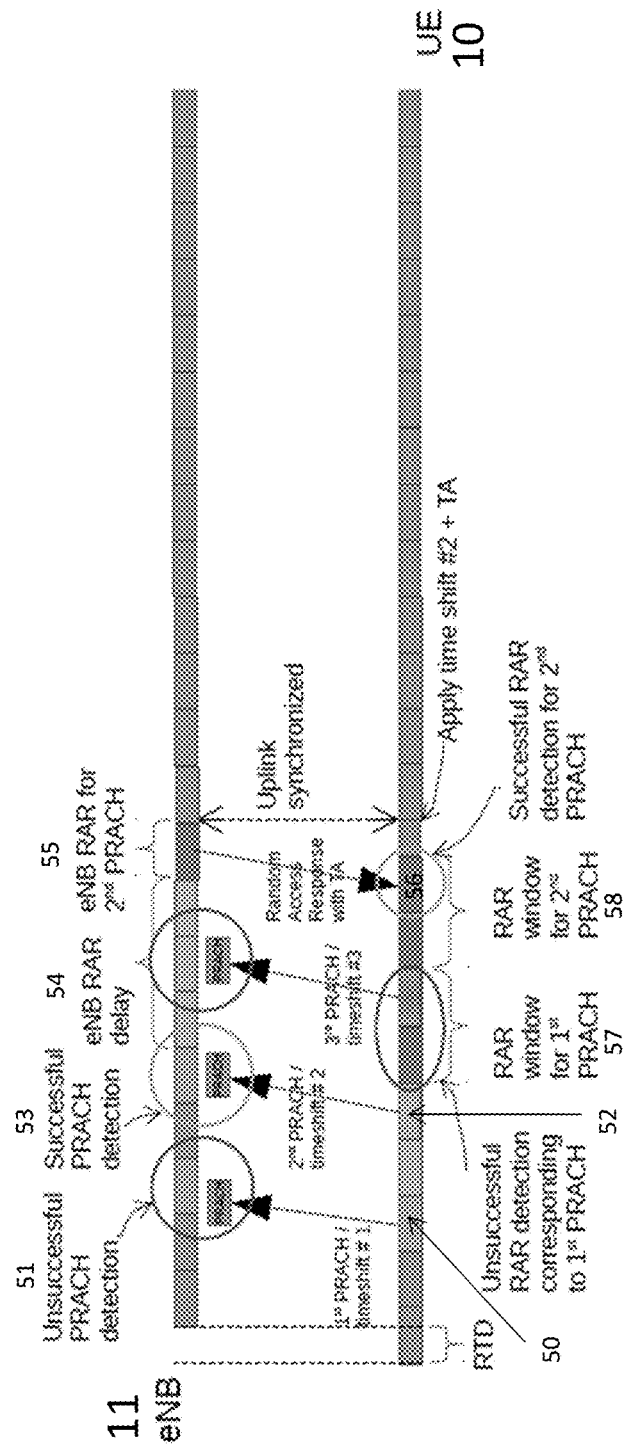
FIG. 5 illustrates PRACH configuration $W_{RAR} \leq D_{PRACH}$ which allows PRACH transmissions with different RTDs in every PRACH subframe and avoids RA window overlapping.

The level of delay reduction depends on the PRACH configuration of the cell:

If the cell has configured the RA response window $W_{RAR}$ shorter or equal in time to the density of the PRACH subframes $D_{PRACH}$, (which can be considered to be the inverse of the frequency of PRACH subframes) i.e. $W_{RAR} \leq D_{PRACH}$ then the UE can transmit a PRACH attempt in every PRACH subframe because this configuration guarantees that the detection windows of adjacent PRACH attempts cannot overlap, see FIG. 5 where $W_{RAR} = D_{PRACH} = 2$ as an example.

From FIG. 5 it is seen that a first PRACH having a timing offset (timeshift #1) attempt 50 is unsuccessful 51. A second PRACH attempt (with a different timing offset of timeshift #2) is sent from UE 10 (52), in this example, this is sent before it is known whether the first PRACH attempt is unsuccessful. The RAR window 57 of the UE 10 for the first PRACH attempt passes without any RA response being received from the cell 11. The first PRACH attempt is therefore considered unsuccessful. Meanwhile, cell 11 detects the second PRACH attempt successfully 53 and after a delay 54 (which is inherent to the cell in question), an RA response is sent 55 which is detected by the UE 10 (56) in a second RA response window 58 after which an uplink between the UE and the cell can be synchronized using timeshift #2. It can be seen in FIG. 5 that $W_{RAR}$ (width of the RA response window in PRACH subframes at the UE)=$D_{PRACH}$ (how often a PRACH subframe is sent from the UE in PRACH subframes)=2.

Figure 6:
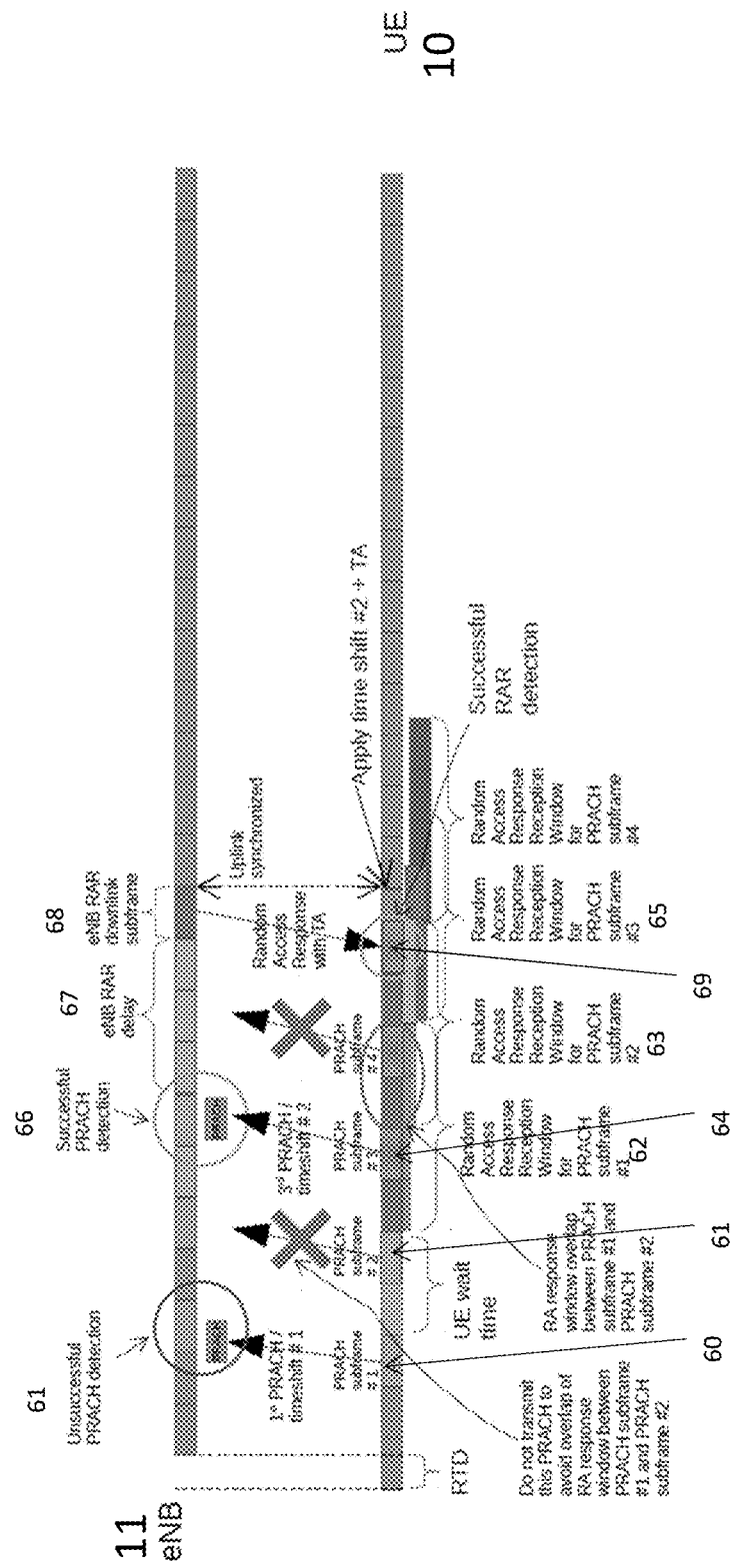
FIG. 6 illustrates RACH configuration $W_{RAR} > D_{PRACH}$ which does not allow PRACH transmissions with different RTDs in every PRACH subframe.

If the cell has configured the RA response window $W_{RAR}$ longer in time than the density of the PRACH subframes $D_{PRACH}$, (which can be considered to be the inverse of the frequency of PRACH subframes) i.e. $W_{RAR}>D_{PRACH}$ the UE can still reduce the RA response delay by missing out some PRACH attempts that would result in a RA response detection window overlapping, see FIG. 6 where $W_{RAR}$=4 and $D_{PRACH}$=2 as an example.

From FIG. 6 it is seen that a first PRACH attempt 60 is unsuccessful 61. The corresponding RA response window 62 for first PRACH attempt 60 is 4 PRACH subframes wide. A next PRACH attempt 61 is not attempted (transmitted) as its corresponding RA response window 63 would overlap with RA response window 61. A second PRACH attempt (with a different negative timing offset) is sent from UE 10 (64) because its RA Response window 65 does not overlap with the first RA response window 62. The RA response window 62 of the UE 10 for the first PRACH attempt 60 passes without any RA response being received from the cell 11. The first PRACH attempt 60 is therefore considered unsuccessful. Meanwhile, cell 11 detects the second PRACH attempt successfully 66 and after a delay 67 (which is inherent to the cell in question), an RA response is sent 68 which is detected by the UE 10 (69) in the second RA response window 65 after which an uplink between the UE and the cell can be synchronized using timeshift #2. It can be seen in FIG. 6 that $W_{RAR}$ (width of the RA response window in PRACH subframes at the UE)=4 and $D_{PRACH}$ (how often a PRACH subframe is sent from the UE in PRACH subframes)=2 which is why PRACH attempt 61 is not transmitted.

At step 44, if a successful RA response is not received once the $N_{RTD}$ preamble attempts have been transmitted, at step 45, the power level of the transmitted PRACH preamble attempts is increased by a predetermined powerstep, and the transmitting step 43 is repeated. Multiple additional iterations of steps 43, 44 and 45 may be carried out until a successful RA response is received, a predetermined maximum desired power level of transmitted PRACH signals is reached, or a predetermined number of iterations has been attempted for example.

If a successful RA response is received, that is to say that transmission of a PRACH preamble with negative offset and at a particular power level has positioned the PRACH preamble within the PRACH detection window of a cell and detectable by the cell, the response from the cell will comprise a timing advance value. The UE is then able at step 46 to synchronize an uplink between the UE and the cell by the UE modifying uplink timing by the negative offset and the timing advance value.

As has been shown, the disclosed method remains compliant with related 3GPP LTE requirements and minimizes additional time taken to complete the RA connection procedure when the UE is positioned outside of the standard maximum cell radius, thus extending the radius of the cell.

The various methods described above may be implemented by a computer program. The computer program may include computer code arranged to instruct a computer, processor and/or system to perform the functions of one or more of the various methods described above. The computer program and/or the code for performing such methods may be provided to an apparatus and/or system, such as a computer or processor, on a computer readable medium and/or a computer program product. The computer readable medium could be, for example, an electronic, magnetic, optical, electromagnetic, infrared, or semiconductor system, or a propagation medium for data transmission, for example for downloading the code over the Internet. The computer readable medium could take the form of a physical computer readable medium such as semiconductor or solid state memory, magnetic tape, punch card, a removable computer diskette, a random access memory (RAM), a read-only memory (ROM), a rigid magnetic disc, and an optical disk, such as a CD-ROM, CD-R/W, DVD or Blu-ray. The computer readable medium may comprise non-transitory media as well as transmission media.

An apparatus such as a computer or processor may be configured in accordance with such code to perform one or more processes in accordance with the various methods discussed herein. A UE may be provided comprising a processor, the processor configured in accordance with such code to perform one or more processes in accordance with the various methods discussed herein.

While example embodiments have been particularly shown and described, it will be understood by those skilled in the art that various changes in form and details may be made therein without departing from the scope of the embodiments encompassed by the appended claims.

The invention claimed is:

1. A method of synchronizing uplink between a user equipment (UE) and a cell, the method comprising:
   determining physical random access channel (PRACH) capabilities of the UE;
   determining a negative timing offset for use with a transmission of at least one PRACH signal;
   determining an order for utilizing the negative timing offset;
   transmitting from the UE, at least one PRACH signal from a group of PRACH signals, each of the at least one PRACH signals having a predetermined power level and transmitted by the UE at a time based on the negative timing offset, the order, and the PRACH capabilities of the UE.

2. The method of claim 1 wherein transmission of each PRACH signal is repeated at a different power level.

3. The method of claim 1 wherein each PRACH signal is transmitted before a random access (RA) response window of a previously transmitted PRACH signal has expired.

4. The method of claim 1 wherein the order is based on an estimated distance between the UE and the cell.

5. The method of claim 4 wherein the estimated distance is derived by at least one of global positioning system (GPS), assisted global navigation satellite system (A-GNSS), enhanced Cell ID (ECID), observed time difference of arrival (OTDOA), and uplink time difference of arrival (UTDOA).

6. The method of claim 4 wherein the estimated distance is derived from a UE pathloss estimate between the UE and the cell and a preamble format of the cell.

7. The method of claim 1 wherein the negative timing offset is derived from a guard time of a preamble format of the cell.

8. The method of claim 1 wherein the number of PRACH signals in the group of PRACH signals is based on the extended cell radius of the cell and the negative timing offset.

9. The method of claim 1 wherein if the UE is able to transmit a plurality of PRACH signals per uplink subframe and receive a plurality of RA responses per downlink subframe, the UE derives a different PRACH signature for the transmission of each PRACH signal and transmits the PRACH signals in the same uplink subframe.

10. The method of claim 9 wherein the UE transmits the same PRACH signals in a subsequent uplink subframe and at a different power level.

11. The method of claim 1 wherein the UE transmits a PRACH signal to avoid overlapping with any previously transmitted PRACH signal based on an RA response window width of the UE and a frequency of PRACH subframes transmitted.

12. The method of claim 1 wherein if an RA response window of the UE is not longer than an inverse of a frequency of PRACH subframes, the UE transmits a PRACH signal on every PRACH subframe.

13. The method of claim 1 wherein if an RA response window of the UE is longer than an inverse of a frequency of PRACH subframes, the UE does not transmit a PRACH signal where a corresponding RA response window would overlap with an RA response window of a previously transmitted PRACH signal.

14. The method of claim 1 wherein if transmission of a PRACH signal positions the PRACH signal within a PRACH detection window of a cell and detectable by a cell; receiving a response in an RA response window of the UE from the cell, the response comprising a timing advance value, and synchronizing an uplink between the UE and the cell by the UE modifying uplink timing by the negative timing offset and the timing advance value.

15. The method of claim 1 wherein when all of the PRACH signals from the group of PRACH signals have been transmitted at a first power level, if an RA response has not been received from the cell, the UE repeats transmission of the same PRACH signals at a different increased power level.

16. An apparatus comprising a processor, the processor arranged to execute computer instructions which when executed cause the processor to perform the method of claim 1.

17. A non-transitory computer readable medium comprising instructions that when executed cause a processor to execute the method of claim 1.

* * * * *